J. J. CLAYTON.
Variable Force Feed for Seeders.

No. 211,087. Patented Jan. 7, 1879.

Witnesses:
Donn I. Twitchell.
Will W. Dodge.

Inventor:
J. J. Clayton
By his Attys.
Dodge & Son

UNITED STATES PATENT OFFICE.

JOHN J. CLAYTON, OF DAYTON, OHIO.

IMPROVEMENT IN VARIABLE FORCE-FEED FOR SEEDERS.

Specification forming part of Letters Patent No. 211,087, dated January 7, 1879; application filed November 11, 1878.

*To all whom it may concern:*

Be it known that I, JOHN J. CLAYTON, of Dayton, in the county of Montgomery and State of Ohio, have invented certain Improvements in Variable Force-Feed for Seeders, of which the following is a specification:

The object of this invention is to provide a force-feed mechanism which may be caused to deliver the grain with greater or less speed, at will, without changing the speed of the feed-wheel; and to this end it consists in dividing a feed cup and wheel into a series of short lengths or sections, and in combining therewith a slide, or its equivalent, in such manner that the grain may be caused to flow through one, two, or more of the sections simultaneously, according to the rate of feed desired.

Figure 1:
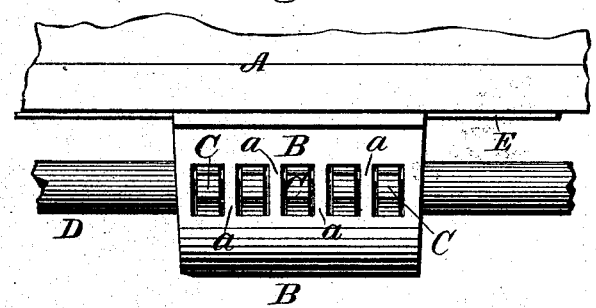
Figure 2:
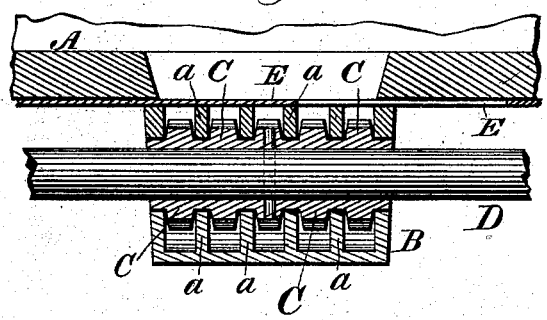
Figure 3:
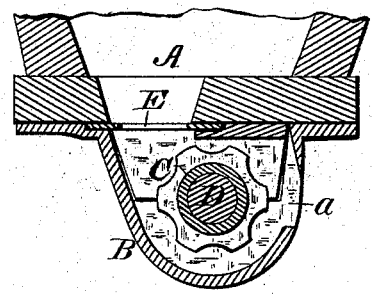

Figure 1 represents a rear elevation of my feeding device; Fig. 2, a longitudinal vertical section of the same; Fig. 3, a vertical cross-section of the same.

A represents the bottom of a hopper or grain-box; B, a metallic feed cup or case, secured to the bottom of the hopper, and receiving grain at its top directly therefrom. As shown in the drawing, the feed-cup B is divided by vertical partitions *a* into a series of separate independent sections or cups, each of which terminates at the rear in an elevated delivery-opening or mouth, as usual in this class of feeders. C C represent a series of feed-wheels, mounted one in each of the sections or compartments of the feed-cup, and all driven by means of a single central shaft, D, as shown.

The feed-cup may be made of any ordinary or desired form in cross-section, and the wheels may be made of any approved style.

Each section or compartment with its contained wheel forms a separate independent feeder, operating to the extent of its capacity in the same manner as the feeders in common use, receiving the grain from the hopper and delivering it at the rear in a continuous stream.

The sections or compartments are made of such size and number that their aggregate delivery shall be as great as is ever required from one feeder or for one hoe of the machine.

Above the feed-cup there is mounted a slide, E, provided with a hole or opening of such size that it will, when properly adjusted, admit grain from the hopper into all the sections and wheels of the feeder.

By moving the slide endwise it may be caused to cut off the flow of grain from all or any desired number of the sections and wheels, and thus the amount of grain delivered from the feeder, as a whole, varied as desired.

If desired, the rear side of the cup or case may be provided with a spout to concentrate the streams delivered from the different sections; and, if preferred, other devices may be substituted for the slide, as a means of controlling the admission of grain to the sections.

It will, of course, be understood that the device shown and described constitutes, as a whole, a single feeder, and that the machine will be provided with a series of them in the same manner as with the feeders of ordinary form.

I am aware that feeders have been made with channels or sections of different sizes to be used one at a time, one or another being employed, according to the rate of feed required; but this I do not claim.

My device may be used for both large and small seed.

What I do claim as my invention is—

1. The combination of a feed-cup divided into independent sections or channels, a corresponding series of feed-wheels, and a slide, or equivalent, arranged so as to cut off the flow of grain through any desired number of the sections at will, substantially as described and shown.

2. The combination, in a seeder, of two or more feed-wheels and means, substantially such as shown, for causing one, two, or more of the wheels to feed simultaneously, the whole constituting a single feeder.

JOHN J. CLAYTON.

Witnesses:
S. H. CARR,
JOHN S. SHANCK.